United States Patent
Moran et al.

(10) Patent No.: US 9,516,262 B2
(45) Date of Patent: Dec. 6, 2016

(54) SYSTEM AND METHODS FOR MANAGING TELEPHONIC COMMUNICATIONS

(71) Applicant: COMIGO LTD., Yarkona (IL)

(72) Inventors: Dov Moran, Kfar Saba (IL); Motty Lentzitzky, Raanana (IL)

(73) Assignee: COMIGO LTD. (IL)

( * ) Notice: Subject to any disclaimer, the term of this patent is extended or adjusted under 35 U.S.C. 154(b) by 120 days.

(21) Appl. No.: 13/888,423

(22) Filed: May 7, 2013

(65) Prior Publication Data
US 2013/0293662 A1 Nov. 7, 2013

Related U.S. Application Data

(60) Provisional application No. 61/643,372, filed on May 7, 2012, provisional application No. 61/643,375, filed on May 7, 2012.

(51) Int. Cl.
| | |
|---|---|
| H04N 7/14 | (2006.01) |
| H04N 21/41 | (2011.01) |
| H04N 21/475 | (2011.01) |
| H04L 29/06 | (2006.01) |
| H04M 7/00 | (2006.01) |
| H04N 21/454 | (2011.01) |

(52) U.S. Cl.
CPC .......... *H04N 7/141* (2013.01); *H04L 65/1069* (2013.01); *H04M 7/0039* (2013.01); *H04N 7/147* (2013.01); *H04N 21/4126* (2013.01); *H04N 21/454* (2013.01); *H04N 21/4755* (2013.01); *H04M 7/006* (2013.01); *H04M 2201/50* (2013.01)

(58) Field of Classification Search
USPC .................. 348/14.01–14.03, 14.07–14.1
See application file for complete search history.

(56) References Cited

U.S. PATENT DOCUMENTS

| | | | | |
|---|---|---|---|---|
| 6,452,974 | B1* | 9/2002 | Menon et al. | 375/240.28 |
| 6,956,871 | B2* | 10/2005 | Wang et al. | 370/503 |
| 7,072,908 | B2* | 7/2006 | Dideriksen et al. | |
| 7,692,724 | B2* | 4/2010 | Arora et al. | 348/515 |
| 8,576,922 | B2* | 11/2013 | Moss et al. | 375/240.28 |
| 8,743,284 | B2* | 6/2014 | Russell et al. | 348/515 |
| 2002/0063780 | A1* | 5/2002 | Harman et al. | 348/211 |
| 2004/0180689 | A1* | 9/2004 | Nayak | H04W 8/22 455/552.1 |
| 2005/0088513 | A1* | 4/2005 | Oswald | H04N 7/147 348/14.02 |
| 2005/0095981 | A1* | 5/2005 | Benco | H04W 4/12 455/3.06 |
| 2006/0020993 | A1* | 1/2006 | Hannum et al. | 725/111 |
| 2007/0139514 | A1* | 6/2007 | Marley | H04N 7/147 348/14.01 |
| 2007/0195158 | A1* | 8/2007 | Kies | 348/14.01 |
| 2007/0255807 | A1* | 11/2007 | Hayashi et al. | 709/219 |
| 2008/0046465 | A1* | 2/2008 | Parker | G06Q 10/10 |

(Continued)

FOREIGN PATENT DOCUMENTS

| | | |
|---|---|---|
| WO | WO 2013/024397 | 2/2013 |
| WO | WO 2013/128460 | 9/2013 |

*Primary Examiner* — Joseph J. Nguyen
*Assistant Examiner* — Phung-Hoang J Nguyen
(74) *Attorney, Agent, or Firm* — Marc Van Dyke; Fourth Dimension IP

(57) ABSTRACT

A communication filtering system comprising an authorization module and a management module. The authorization module is configured to selectively authorize an incoming call according to media content rendered by a media renderer. The management module is configured to manage filtering of multiple incoming calls directed to a telephony system according to the selective authorizations of the multiple incoming calls by the authorization module.

10 Claims, 11 Drawing Sheets

(56) References Cited

U.S. PATENT DOCUMENTS

| | | | |
|---|---|---|---|
| 2009/0202057 A1* | 8/2009 | Tartarelli | H04L 29/06027 379/142.04 |
| 2009/0207306 A1* | 8/2009 | Hagg | 348/512 |
| 2009/0323907 A1* | 12/2009 | Gupta | H04M 1/6505 379/88.13 |
| 2010/0067882 A1* | 3/2010 | Axen et al. | 386/124 |
| 2010/0159430 A1* | 6/2010 | Lee et al. | 434/307 R |
| 2010/0180313 A1* | 7/2010 | Bi | H04N 5/76 725/110 |
| 2010/0246794 A1* | 9/2010 | Gupta | H04M 3/4365 379/210.02 |
| 2011/0116615 A1* | 5/2011 | Holtel | H04L 12/2827 379/201.02 |
| 2011/0211682 A1* | 9/2011 | Singh | H04M 1/57 379/142.05 |
| 2011/0246202 A1* | 10/2011 | McMillan et al. | 704/270 |
| 2011/0320278 A1* | 12/2011 | Littman | G06Q 30/0261 705/14.58 |
| 2012/0027191 A1* | 2/2012 | Baril | H04M 3/436 379/210.02 |
| 2012/0071150 A1* | 3/2012 | Gong | 455/418 |
| 2012/0121075 A1* | 5/2012 | Strasters | H04L 12/2898 379/93.23 |
| 2012/0200773 A1* | 8/2012 | Davis | 348/515 |
| 2012/0206558 A1* | 8/2012 | Setton | 348/14.03 |
| 2012/0218422 A1* | 8/2012 | Benhellal | 348/207.1 |
| 2012/0314777 A1* | 12/2012 | Zhang et al. | 375/240.26 |
| 2013/0070153 A1* | 3/2013 | Hill | H04N 21/42228 348/569 |
| 2013/0157632 A1 | 6/2013 | Moran | |
| 2013/0178151 A1* | 7/2013 | Itzhaki | 455/26.1 |
| 2013/0238796 A1 | 9/2013 | Lentzitzky | |
| 2013/0245796 A1 | 9/2013 | Lentzitzky | |
| 2013/0246530 A1 | 9/2013 | Lentzitzky | |

\* cited by examiner

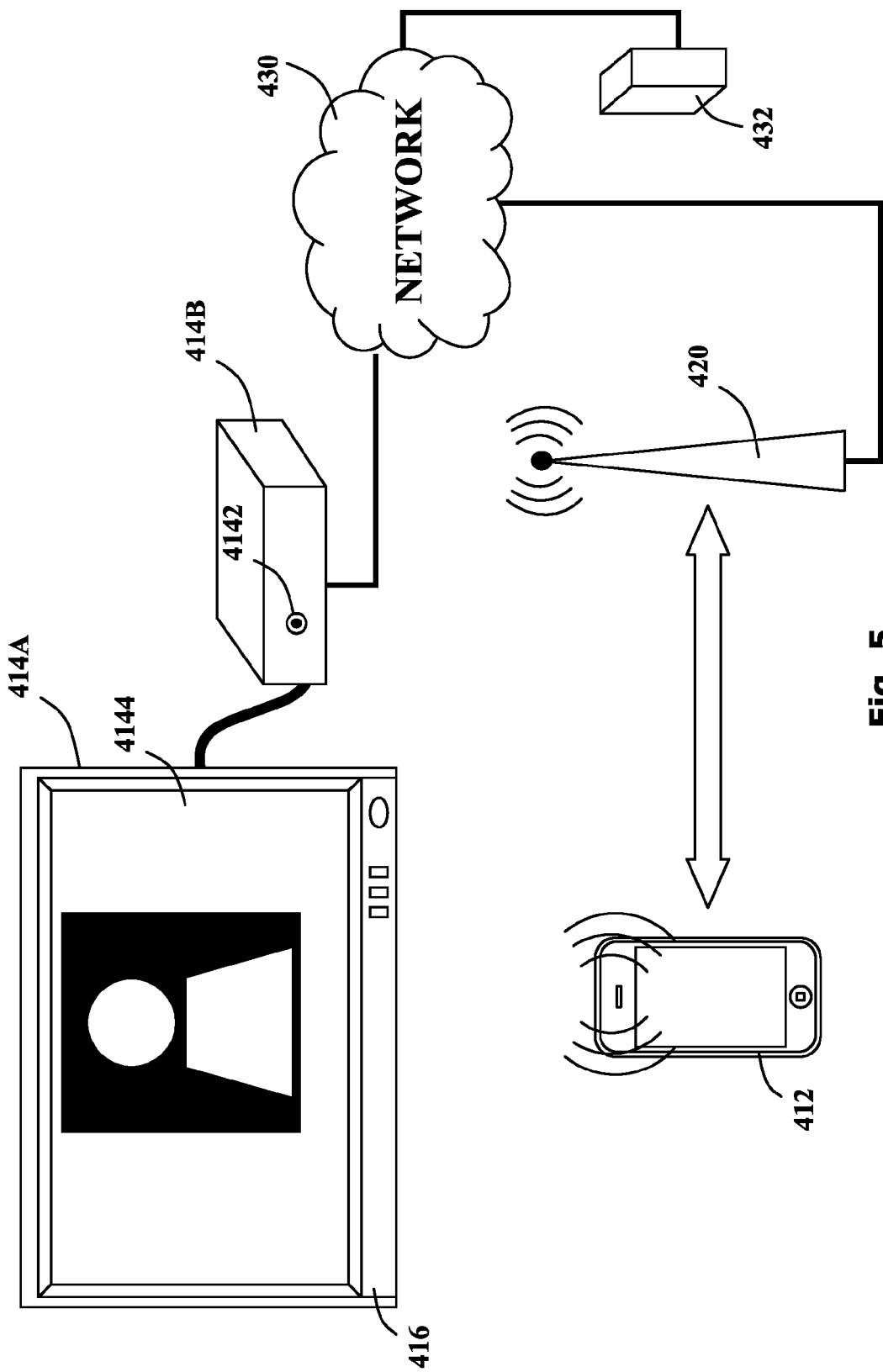

SYSTEM AND METHODS FOR MANAGING TELEPHONIC COMMUNICATIONS

CROSS-REFERENCE TO RELATED APPLICATIONS

This application claims the benefit of priority from U.S. Provisional Patent Application No. 61/643,372 filed May 7, 2012, and U.S. Provisional Patent Application No. 61/643,375 filed May 7, 2012 the contents and disclosures of which are incorporated herein by reference in their entirety.

FIELD OF THE INVENTION

The disclosure herein relates to telephonic communication devices and the management thereof. In particular the disclosure relates to establishing telephonic communication having video and audio streams. The disclosure further provides for a desired viewing experience based upon current media consumption, allowing incoming phone calls only if associated with the media content consumed.

BACKGROUND OF THE INVENTION

Interpersonal communication relies upon many cues and signals. Apart from the auditory signals provided by language very important information is transmitted via various visual signals. Facial expressions, hand signals, eye movements and the like may relay more information than the words themselves. If a picture can speak a thousand words a moving picture may speak many thousands of words per second.

Video telephony simultaneously presents to a contact visual and auditory data streams allowing each contact to see as well as hear their co-contact. Nevertheless, as important as visual signals are to interpersonal communication there has been strong market resistance to the acceptance of video telephony.

There may be a number of reasons for the market's reticence to adopt video telephony, in particular, until relatively recently; video screens connected to communication networks may not have been sufficiently available. However with the rise in use of mobile telephones, tablets, computers, smart televisions and the like, video display screens are becoming much more widespread. Many such communication devices provide the functionality of making video telephone calls; even so, video telephony is still not widely accepted.

One possible reason for the slow uptake of the technology may be the limited bandwidth of many communication devices. Live video streaming generally demands a high bandwidth; therefore in order to provide the video stream for a video telephone call over a limited bandwidth many service providers reduce the frame rate. This may result in a substandard disjointed or jerky video experience. Consequently, the video telephony functionality of communication systems does not provide a comfortable user experience and as a result is often ignored by the user.

Furthermore, the mobile phone has become an essential part of the modern era, used in all aspects of everyday life. As mobile phones are increasingly used as the primary telephone, mobile users may receive calls at inconvenient times; at work, at a meeting, family gathering, at the theater, while sleeping and much more. If the incoming call is not desired, the process of handling it is interruptive and distractive.

As such, phone call filtering is becoming a more common requirement of any communicating device. The basic functionality of filtering incoming calls and text messages is commonly available by specifying white lists of allowed contacts or blacklists for disallowed contacts. A wider scope of filtering may offer anonymous call rejection, priority ringing to help dealing with unwanted calls, dropping any call with a busy signal, or sending the contact to a voicemail. Additionally, calls may be rejected from certain prefixes or area codes, avoiding international calls or handling telemarketers. Call screening may let you know who's calling before you accept a call, as an additional feature, and much more. The functionality referred to hereinabove, may be available for mobile phones and landline phones alike, either through services of telephone companies or through applications incorporated on the device itself by handset manufacturers or as downloaded applications of other software vendors.

The media viewing experience is growing even more diverse with video content becoming available on various devices such as media renderers including television, personal computers, tablets, mobile communication devices, telephones, hand held devices and the like. In parallel, the social environment is changing, taking advantage of new emerging technologies and yielding a whole new world of experiences. Combining the digital media, specifically the television as a platform, with the social environment increases the demand for sharing digital content and views. The expectation of viewers is of uninterrupted viewing experience, and the disclosure herein relates to filtering the disturbing incoming calls.

SUMMARY OF THE INVENTION

It is according to a first aspect of the current disclosure to introduce a video telephone communication system for managing a telephonic communication session. The system may comprise at least one audio transmission unit operable to relay an audio stream, and the at least one audio transmission unit comprises at least one speaker operable to relay sound to a contact; at least one video transmission unit operable to relay a video stream to and from the at least one contact at the least one video transmission unit comprises at least one display operable to receive image of at least one contact. The video communication system also comprises at least one synchronization interface operable to synchronize the audio stream with the video stream. The two streams, the audio stream session and the video stream session may be established independently from one another.

Optionally, the at least one audio transmission unit of the video telephone communication system of may be incorporated into a first device and the at least one video transmission unit may be incorporated into a second device. Variously, the first device may be selected from the group consisting of a telephone, a headset, a headphone, an earpiece and a mobile communication device. Variously, the second device may be selected from the group consisting of a television set, a set-top-box (STB), a desktop computer, a laptop computer, a tablet, a telephone and a mobile communication device.

Optionally, the at least one audio transmission unit of the video telephone communication system may comprise at least one microphone operable to pick up sound and voice of said at least one contact; optionally, the at least one microphone of the audio transmission unit may be located independently of the at least one speaker.

In some embodiments, the at least one audio transmission unit of the video telephone communication system may further comprise of at least one transceiver operable to communicate with a remote station to establish a two way audio data stream.

In some embodiments the at least one video transmission unit of the video telephone communication system may comprise a video camera operable to capture images of the at least one contact during a telephone communication; The video camera of the video transmission unit may be positioned at a distance from the contact such that the video camera is able to capture images encompassing a reasonable frame size and may be located independently and separated from the at least one display.

Optionally, the at least one video transmission unit of the video telephone communication system may further comprise at least one transceiver operable to communicate with a remote station to establish a two way video data stream.

It is according to second aspect of the current disclosure to present a communication filter software system to achieve a desired viewing experience based upon current media consumption. As appropriate, such system may comprise: a management module, configured to manage content based call filtering; a social configuration module, configured to manage one or more social entity; and an authorization module, configured to manage the assignment of permissions to the one or more social entity. Variously, the term of social entity within the scope of the communication filtering software system is selected from the group consisting of: a social group, a social set, and a social group member.

It is according to another aspect of the disclosure to teach a method for managing a video telephone communication session between a plurality of contacts. Such a method comprises the steps of: establishing an audio stream session to at least one contact, where the audio stream session is providing audio synchronization info; and establishing a video stream session to the at least one contact, where the video stream session is providing video synchronization info;

The two stream sessions, the audio stream session and the video stream session may be established independently from one another.

Optionally, the method may further comprise the step of: providing a session synchronization interface; as appropriate the session synchronization interface is receiving said audio synchronization info and the video synchronization info to synchronize the audio stream session and the video stream session.

Optionally, the method may comprise updating the session synchronization interface in real time to validate that the audio and video streams are synchronized.

It is according to a further aspect of the disclosure to teach a method for filtering telephone communication to provide a desired viewing experience based upon current media consumption. The method comprising the steps of: generating a recipient whitelist, where the recipient whitelist contains at least one allowable profiling structure; profiling of incoming communication to generate at least one contact profiling structure; and applying a filtering function operable to selectively allow the incoming communication.

Variously, the at least one allowable profiling structure is generated based on one or a combination of input structures selected from the group consisting of a contact identification, a personal preference input, current media content input, a media content history input and a social network input. As appropriate, the contact identification is selected from the group consisting of a contact name, a contact ID, a contact phone area and a contact tagged information; the personal preference input reflects viewing preference based on preference data of a recipient; the current media content input reflects the currently viewed content by said recipient; the media content history input reflects viewing preference based on content viewing history of said recipient; and the social network input reflects collaborating information of social spaces.

Variously, the at least one contact profiling structure may be generated based on one or a combination of input structures selected from the group consisting of a contact identification, a contact preference input, a social network input. As appropriate the contact identification is selected from the group consisting of a contact name, a contact ID, a contact phone area and contact tagged information; the contact preference input reflects viewing preference based on preference data of contact; and the social network input reflects collaborating information of social spaces.

Where appropriate, the step of applying a filtering function comprises comparing at least one allowable profiling structure with at least one contact input reference.

The method for filtering telephone communication may further comprise a step of allowing the incoming communication where matching a threshold criteria is achieved. Variously, the matching of threshold criteria may be selected from a group consisting of matching all compared values, matching of at least one compared value, matching of more than a percentage of compared values and a weighted average being above a matching threshold level.

Optionally, the method may comprise updating of recipient whitelist structures in real time.

Optionally, the method may comprise functionality that if the at least one incoming phone call is identified by a contact unknown parameter, then the at least one incoming phone call may be blocked.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings:

FIG. 5 is a schematic representation of still another embodiment of a video telephony system including a video transmission unit incorporated into a television set and set-top-box connected to the internet and an audio transmission unit incorporated into a telephone handset connected to a cellular network;

DETAILED DESCRIPTION OF THE INVENTION

Figure 1:
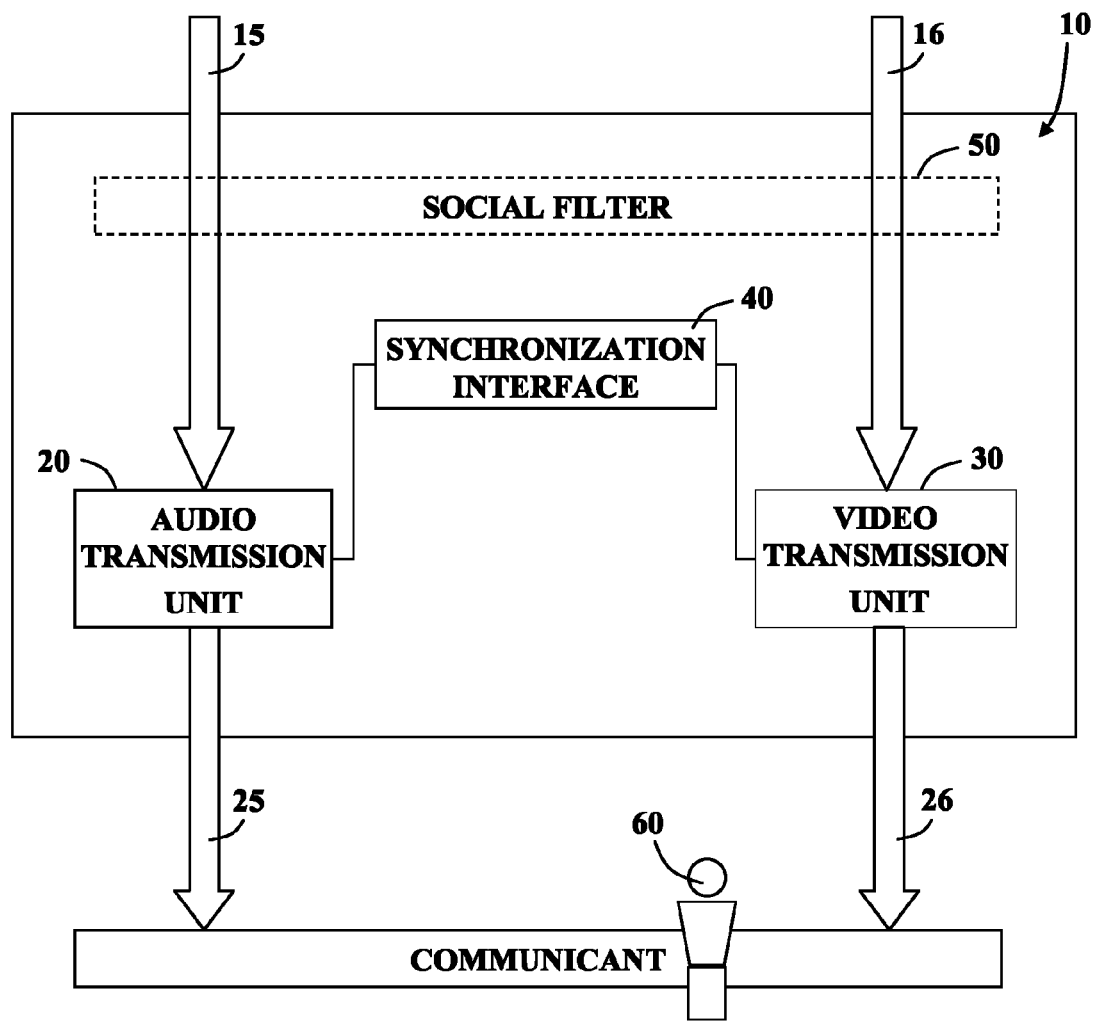
FIG. 1 is a block diagram representation of a video telephony system including a video transmission unit, an audio transmission unit and a synchronization interface.

The current disclosure may enable telephony to become less intrusive in general and for video telephony to become a more popular communication method. A split system is introduced which separates an audio stream from a video stream for data transfer. The split streams may overcome many of the drawbacks associated with current video telephony systems which have prevented their widespread acceptance.

Another aspect of the current disclosure is to provide for a desired viewing experience based upon current media consumption, allowing incoming phone calls selectively according to the media content being consumed. The monitoring and filtering of incoming phone calls, may enhance consumer comfort and convenience while watching television programs. In particular, calls may be allowed to go through only if they relate to media content being consumed at the time of reception in accordance with a user's viewing preferences.

Technologically, the implementation of some aspects of the current disclosure may use advanced analyzing technology. Analysis, to filter incoming calls, may use an incorporated memory loaded phone application interacting with a client terminal such as a set-top box (STB), mobile communication device or the like, operable to meet user defined preferences, monitor available media content and control the input media renderer, accordingly.

Definitions

As used herein, a user refers to an individual (or a group of individuals) operating a system or a component thereof of the disclosure (e.g., a client terminal) or performing a method of the disclosure.

As used herein, an owner refers to an individual (or a group of individuals) that is associated with a particular client terminal.

As used herein, a social group comprises one or more members. A member may be an individual or a group of individuals. A social group may be classified, for example, according to various preferences, tastes or interests of social spaces. One or more members of the social group may be authorized, by assigning permission, to perform remote recording of desired content in the system of one or more other members of the social group, or may be narrowed to specific categories only.

The social group, or a subset thereof, may be a social set, which is defined herein as a set of members that are configured to view a shared media session. The shared media session is a media content that is configured to be viewed simultaneously (or recorded) by members of the social set to which the shared media session is assigned. One shared session may be assigned to one or more social sets.

The social group, the social set, and the individual member of a social group may be referred to, generically, as a social entity. A social group comprises one or more members. A social set comprises one or more members within a social group assigned to a shared media session. The various social entities may be nested. That is, one or more members may be included into a social group or a social set, and one or more social sets may be included in a social group.

A user may be a member, and a member may be a user.

As used herein, media content may be any information content that may be experienced by a user, including but not limited to television shows, radio shows, movies, video clips, slideshows, multimedia presentations, pictures, games, audio content, music, and the like.

As used herein, a client terminal is a device that is operable to meet user defined preferences, monitor available media content and/or control the media content input to a media renderer. The client terminal may include, or be externally connected to, a digital video recorder (DVR). A client terminal may comprise, be connected to, be incorporated into or be otherwise associated with, without restriction, a television set, a set-top-box (STB), a desktop computer, a laptop computer, a tablet, a telephone, a mobile communication device or the like. A set-top box (STB) is an information appliance that connects to a television set and an external source of signal, decoding that signal into content that can be presented on a television screen or other display device as media content. The STB may be a cable television STB. As used herein, a DVR is a device that is capable of recording media content of various types; television programs, audio content, visual content, audiovisual content, multimedia content and the like, for example by saving them onto a recording device such as a hard drive for a later use. Such content may be subsequently used for playback, viewing, editing or the like. The DVR may variously include a local data storage unit, a remote data storage unit accessible by a media renderer client terminal or the like. The DVR may additionally or alternatively include a device configured for playback from VOD, DVD recorders, server based DVR's services and the like. Additionally, while recording, users may switch to view other television programs or to various other media modes.

As used herein, a media renderer is a device that is operable to present media content into a consumable form (e.g., visible, audible and the like). The media renderer may be one or a combination of, without restriction, television sets, monitors, speakers or the like.

Video Telephony Functionality

The current disclosure provides for video telephone communication functionality to run on separate different channels using at least one audio transmission unit operable to relay an audio stream to and from at least one contact and at least one video transmission unit operable to relay a video stream to and from at least one communicant, while the audio stream is transmitted independently from the video stream, making the video communication more feasible. Where appropriate, management interface functionality may be added to provide synchronization between the audio stream and the video stream.

Video Telephony System Embodiments

Referring to FIG. 1, a block digaram representation is presented of selected components of a video telephone communication system 10. The video telephone communication system 10 may be operable to process an incoming audio stream input and an independent incoming video stream input 16 and to output to a contact 60 an audio stream output 25 which is coordinated to a corresponding video output stream 26. The video telephonic communication system 10 may include at least one audio transmission unit 20, at least one video transmission unit 30 and a synchronization interface 40.

Optionally, the video telephone communication system block digaram representation may comprise a social filter 50.

The at least one audio transmission unit 20 is configured to receive at least one audio stream input 15 and the at least one video transmission unit 30 is configured to receive at least one video stream input 16. The synchronization interface 40 may be operable to synchronize the two input streams 15, 16 to achieve matching of sound and video.

Optionally, the synchronized incoming phone call may undergo an early filtering analysis through a social filter 50 to provide the desired comfort of viewing experience.

Figure 2:
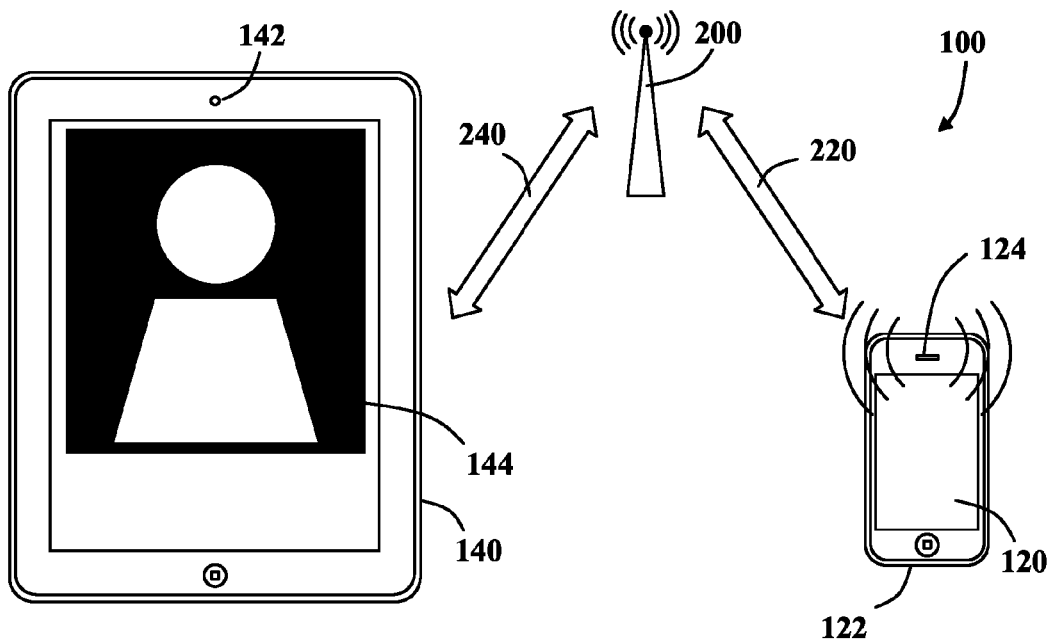
FIG. 2 is a schematic representation of an embodiment of a video telephony system including a video transmission unit incorporated, by way of example, into a tablet computer and an audio transmission unit incorporated into a telephone handset.

Referring to FIG. 2, the video telephone communication system 100 may include at least one audio transmission unit 120 and at least one video transmission unit 140. The audio transmission unit 120 may serve to relay an audio stream to and from a user while the video transmission unit 140 may be provided to relay a video stream to and from the user.

The video transmission unit 140 may include at least one display 144 for displaying images of the co-contact during the communication. The video transmission unit 140 may further include a video camera 142 operable to capture images of the contact during a telephone communication which may be transmitted to a co-contact. The video transmission unit 140 may be conveniently positioned at a distance from the user such that the camera 142 is able to capture images encompassing a reasonable frame size.

Various examples of video transmission units 140 may be used as suit requirements. For example, as shown schematically in FIG. 2, the video transmission unit 140 may be a tablet computer incorporating a screen 144 for displaying a video image, a front facing camera 142 operable to capture images of the contact, and a transceiver operable to communicate with a remote station 200 thereby establishing a two way video data stream 240. A software application may be executed by the computer to manage and control the video capture, display and transmission. Alternatively the video transmission unit may be incorporated into other units such as a laptop computer 150, a television 416 or the like as shown schematically in FIGS. 4 and 5.

The transmission unit 122 may include at least one speaker 124 for relaying sound to the contact. The audio transmission unit 120 may further include at least one microphone 122 operable to pick up sound in general and a voice of a contact in particular, which may be transmitted to a co-contact engaged in a telephonic communication.

Figure 3:
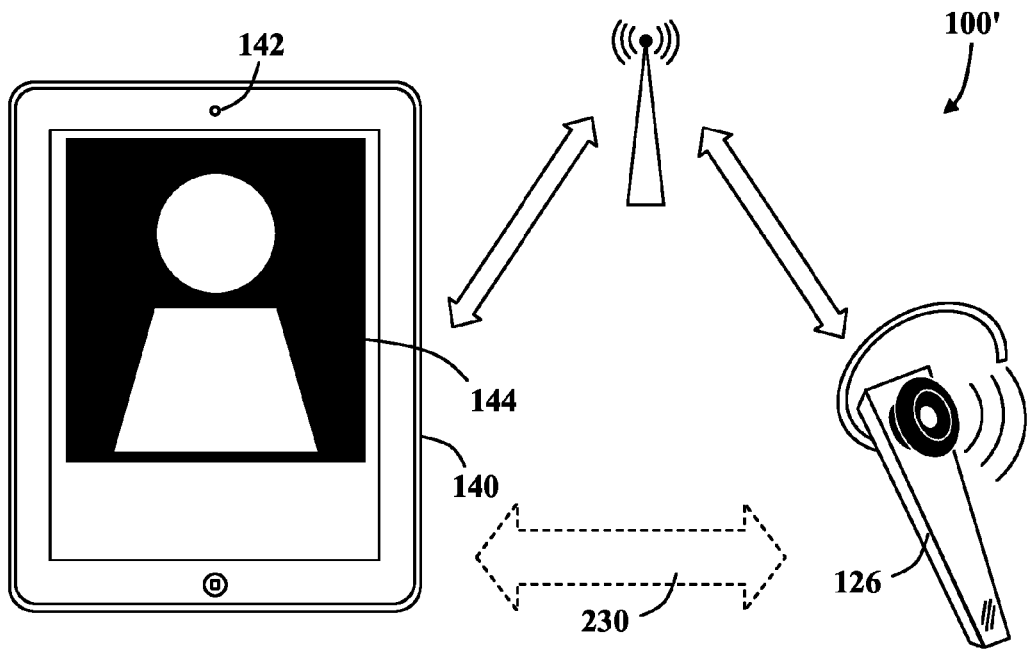
FIG. 3 is a schematic representation of another embodiment of a video telephony system including a video transmission unit incorporated, into a tablet computer and an audio transmission unit incorporated into an earpiece.

Various audio transmission units 120 may be used as suit requirements. For example, as shown schematically in FIG. 2, the audio transmission unit 120 may be a telephone handset incorporating a microphone 122 and speaker 124 and at least one transceiver operable to communicate with a remote station 200 thereby establishing a two way audio data stream 220. Alternatively, other audio transmission units may include headsets, headphones, earpieces 126 or the like such as shown in the system 100' of FIG. 3 which may be operable to communicate with the remote station 200 directly or alternatively via connection 230 a local base station. Where appropriate, the video transmission unit 140 may itself serve as the local base station if required.

It is noted that the optimal positions for the video transmission unit 140 and audio transmission unit 120 depend on the different requirements of the units. Whereas the video transmission unit 140 may be conveniently placed at a distance from the user, as described above, so as to capture images encompassing a reasonable frame size, the audio transmission unit 120 may be more conveniently positioned such that the speaker 124 may be adjacent to the ear of the user, with the microphone 122 proximate with the user's mouth.

The different requirements described above demonstrate a further problem with known all-in-one video telephone systems which have a single device, such as a tablet, telephone handset or the like, serving both as video transmission unit and audio transmission unit. Typically the user of an all-in-one video telephone system must either compromise the size of the video frame or may otherwise need to talk loudly or even shout towards a distant microphone. Similarly, it is not easy to carry on a discrete telephone conversation when the speakers are positioned so as to broadcast the voice of the co-contact over a distance.

It is a feature of the currently disclosed system that the user is able to use a separate video transmission unit 140 and audio transmission unit 120 and to position both where most convenient for their own requirements.

Furthermore, the currently disclosed video telephony system allows a separate video stream 240 to be established independently from the audio stream 220. Accordingly the two data streams do not need to share bandwidth which may allow for faster data transfer rate to be maintained. This may allow the video image to be transferred in a more efficient manner.

Figure 4:
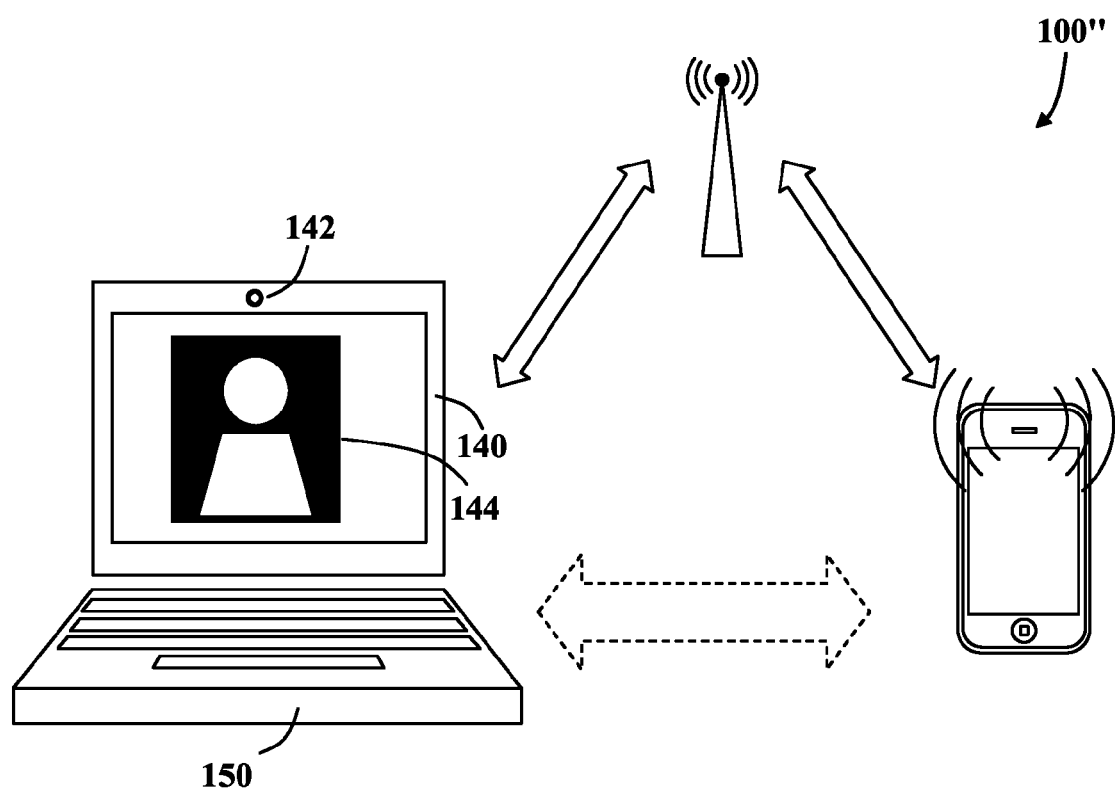
FIG. 4 is a schematic representation of another embodiment of a video telephony system including a video transmission unit incorporated, by way of example, into a laptop computer and an audio transmission unit incorporated into a telephone handset.

Referring now to FIG. 4, a schematic representation is presented of another embodiment of a video telephony system 100". The video telephony system 100' may include a video transmission unit 140 incorporated, by way of example, into a laptop computer 150 and an audio transmission unit 120 incorporated into a telephone handset. The audio transmission unit 120 may serve to relay an audio stream to and from a user while the video transmission unit 140 may be provided to relay a video stream to and from the user.

Accordingly, a distributed synchronization interface may be managed on multiple devices such as via application software program modules executed on remote devices, for example a computer and a communication device, such as a telephone. Where required a communication line between the remote devices may be provided to coordinate function of the modules running thereupon.

Referring now to FIG. 5, a schematic representation is presented of another embodiment of a video telephony system 410. The video telephony system 410 includes an audio transmission unit incorporated into a telephone handset 4120 and a video transmission unit incorporated into a television set 414A and set-top-box 414B. The television set 414A may provide a screen 4144 for presenting the image of the remote co-contact and the set-top-box 414B may provide a video camera 4142 for capturing an image of the local contact. The set-top-box 414B may be connected to the television and to a computer network 430 such as the World Wide Web or internet, optionally via communication cables. It is particularly noted that the stationary nature of large televisions allows them to be readily connected to fast communication lines such as cables, optical fibers or the like. Accordingly, the video stream may be carried along a large band width connection to the computer network 430.

The telephone handset 412 may be connected to a cellular network 420 wirelessly and thereby to receive the audio communication stream. Although the bandwidth of the cellular network may be limited and suitable only for an audio data stream, the video stream need not be carried thereby. By splitting the data streams between audio and video and simultaneously transmitting them along different channels, it may be possible to provide a video stream synchronized to the audio signal in real time. Optionally, a server 432 connected to the computer network 430 may be used to control the communication and to synchronize the audio and video streams. Accordingly the user experience may be greatly enhanced and video telephony may become a more realistic option for the user. Alternatively, coordination or synchronization may be managed locally using software installed upon at least one of the audio transmission unit, the video transmission unit, the set-top-box or distributed among these or other devices.

Content-Based Content Filtering Functionality

Incoming calls may be filtered before they reach a target recipient according to various parameters. The incoming filter may be controlled locally, possibly using an associated phone application such as a dedicated software package or may be managed remotely via a connection to a computer network.

An incoming communication may provide various contact identifying parameters such as contact identification (ID), contact's name, contact phone area, contact tagged information and the like. Accordingly, the incoming communication may be tested regarding whether such an entry exists in a dynamic white list associated with the target recipient. The dynamic white list may be generated and constantly updated by a white list generation function of an associated phone application. The incorporated application may update the dynamic white list based upon categories such as personal preferences of the target recipient, media content preferences of the target recipient, social definitions gathered from members of social spaces and the like and optionally any further identifying parameters.

Additionally or alternatively, a black list may be used, specifying contacts or other parameters upon which incoming calls may not be allowed.

It is noted that a white list, in the context of the current disclosure may refer to a list of contacts identified by contact name, contact ID, tagged information or the like, allowing incoming calls from contacts of the list to go through and reach the target recipient.

It is further noted that a white list may additionally refer to a set of numerical or alphabetical values, for example, or a combination thereof, reflecting preferences that needs to be matched. Such preferences may reflect various categories of personal preferences, media content of interest, social space input and the like.

Matching may be achieved according to a preconfigured level. For example, matching may require being defined as all values defining an entry in a white list to match, at least one value matching, more than half matching, a weighted average being above a matching threshold level and the like.

Additionally or alternatively, the generated dynamic white list or the optional, manually configured black list may be stored locally perhaps on an STB, or remotely on server accessible through a computer network such as the World Wide Web or the Internet.

Additionally or alternatively, manual configuration may allow a user to assign values, numbers or contacts to a dynamic white list, perhaps providing permissions to certain contacts regardless of currently consumed digital content. Similarly, a black list may also be configured manually for blocking unwanted contacts specifically or blocking any unidentified incoming call and the like.

User Preference Profile

The interests of a viewer may be reflected through a user preference profile. The personal preferences may be automatically configured, and/or manually adjusted and may be stored in the user preference profile. Manual configuration may designate categories of interests and the like, while automatic configuration may require machine learning algorithms or statistical analysis tools to deal with its complexity and high dimensionality.

Alternatively or additionally, the configuration process for the user preference profile may be expanded to include collaborating information of its social spaces, if the architecture is network-based. Thus, the configuration process may include the collection of data which may be classified, for example, according to various preferences, tastes or interests of social space members, sharing a common television set (or other digital media) or simultaneously viewing the same content on separate television sets (or other digital media) or in different locations.

Alternatively or additionally, the automatic configuration process may generate a score for each content item of interest, for example, based on a number of watching times or the like, to construct the content structure.

For manual configuration of the user preference profile, the management module may drive interaction with the user via a user friendly interface. Additionally, the configuration process may work in different possible architectures, such as using a network based approach as described herein to allow for the configuration of the user preference profile through remote activities.

Further, the preference profile may be utilized to generate suggestions for social entity selection and media content selection for media content filtering activity.

Content-Based Filtering Management Software

The architecture of the content based contact filtering management software may include various functional modules such as a management module, a social configuration module, an authorization module, an integration module and the like. Optionally or additionally, content based contact filtering management software may be integrated into other expanded social media platforms.

The management module may control the phone call filtering setting functionality, data reception and communications with the other modules. Additionally, the media management system may communicate related information to the user via an overlay superimposed upon the screen of a television set or other media renderer.

The social configuration module may allow the social environment to be configured to suit requirements. For example, configuring of the social environment may include the creation of social groups, adding or removing members of social groups, defining permissions, editing related social information of members or the like. The social configuration module may be implemented to provide lightweight dedicated functionality or optionally, may be integrated with other social modules, for example, such as described in the applicant's co-pending applications such as PCT Patent Application No. PCT/IB2012/054016 and PCT Patent Application No. PCT/IL2013/050186, U.S. patent application Ser. Nos. 13/787,905 and 13/804,381 which are incorporated herein by reference.

Optionally, the authorization module may be provided to manage the assignment of permissions to members of a social space.

Optionally, the integration module may be provided to manage the integration with a smart home controller, to control home automated systems, such as described in the applicant's co-pending application relating to home automation of U.S. patent application Ser. No. 13/804,545.

Where required, a dedicated content based contact filtering module may be provided specifically to manage such functionality as a stand-alone application. Alternatively or additionally, the application may be integrated with other features of a social platform, for example, such as described in the applicants co-pending applications such as PCT Patent Application No. PCT/IB2012/054016 and PCT Patent Application No. PCT/IL2013/050186, U.S. patent application Ser. Nos. 13/787,905 and 13/804,381 which are incorporated herein by reference.

Content-Based Filtering System Components

In various embodiments of the disclosure, one or more tasks, as described herein may be performed by a data processor, such as a computing platform or distributed computing system for executing a plurality of instructions. Optionally, the data processor includes or accesses a volatile memory for storing instructions, data or the like.

Additionally or alternatively, the data processor may access a non-volatile storage, for example, a magnetic hard-disk, flash-drive, removable media or the like, for storing instructions and/or data.

Optionally, with the introduction of Wi-Fi integrated chipset into televisions, enhanced user interface may use smart phones, tablet or other sophisticated devices to make the phone call filtering integrated with social the viewer's social space easier and friendlier, enriching the viewing experience.

Content-Based Control System Embodiments

Figure 6A:
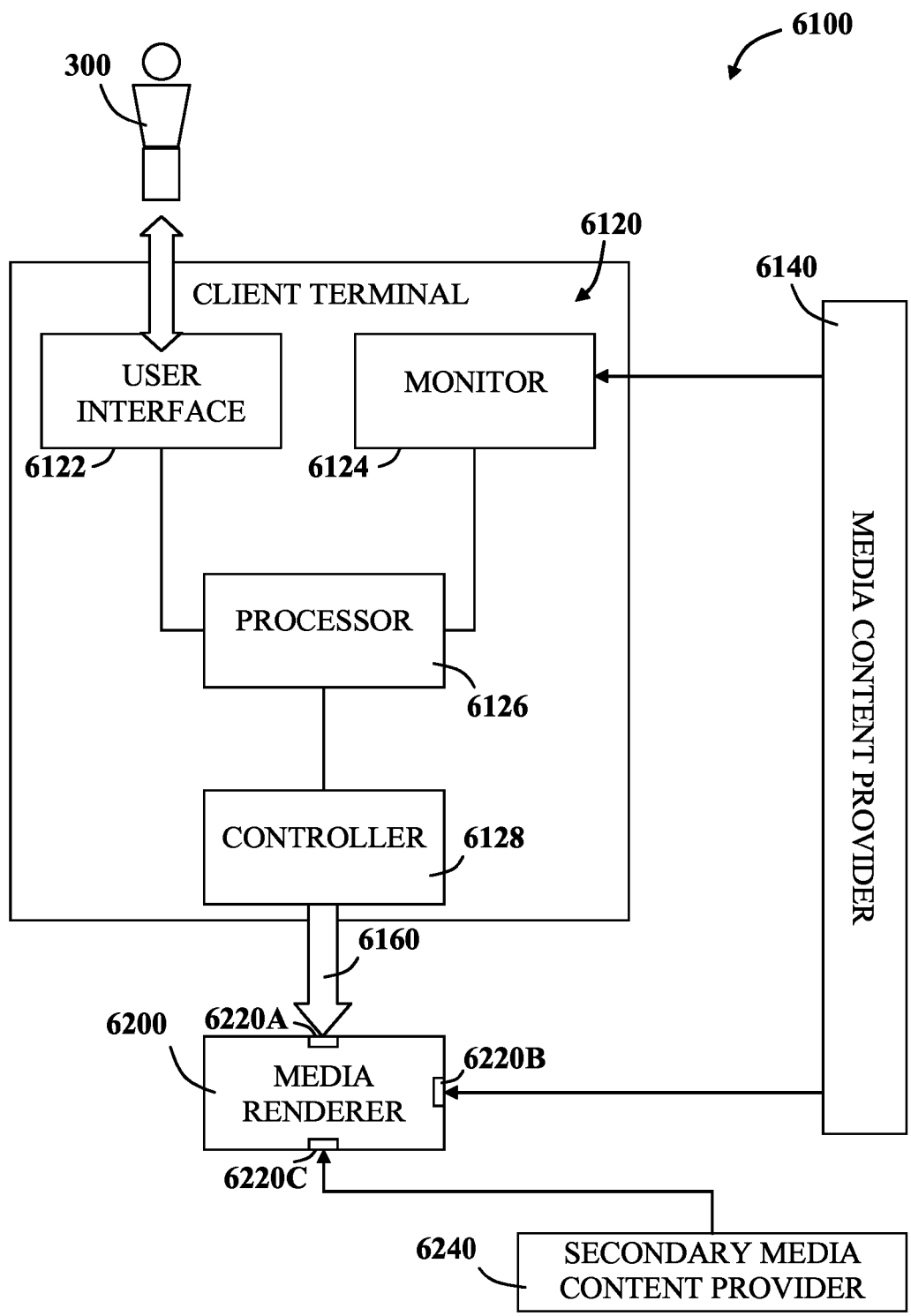
FIG. 6A is a block diagram representing one possible configuration of selected elements of a system for content based management of a media renderer with local processing of home media viewing.

With reference to FIG. 6A, showing a block diagram representing the main components of one possible configuration of selected elements of a media management system 6100 for content based control of a media renderer 6200. The media management system 6100 includes a client terminal 6120 in communication with a media content provider 6140 connecting to the media renderer 6200 via a communication channel 6160. The client terminal 6120 includes a processor 6126 and may include additional components such as a controller, a user interface and a media monitor.

Optionally, a user interface 6122 of the client terminal 6120 may be used to allow a media consumer 300 setting preferences to be used by the media management system 6100 selecting control signals sent to the media renderer 6200. Various user interfaces 6122 are known in the art such as keyboards, touch screens, remote controls, pointing devices and the like and may be used to input data to the client terminal 6120. Optionally, the media renderer 6200 itself may serve as at least part of the user interface 6122, for example, by providing an output screen or input device.

The processor 6126 of the media management system 6100 is operable to receive media content data from the media-monitor 6124, and to record a user preference profile related to media content accessed. The controller may further select control signals, which the controller 6128 may send to the media renderer 6200.

It is noted that the media renderer may comprise a plurality of connector ports 6220A-C which may be connected to a number of media sources. For example, a first port 6220A may be connected to the client terminal 6120; a second port 6220B may be connected to the media content provider 6140 and a third port 6220C may be connected to a secondary media content provider 6240.

The filtering and recommendation of the television social functionality categories may be controlled by a user preference profile, for example, generated by a software application running on the client terminal processor 6126, or customized manually. Such a preference profile may reflect the categories and preferences of viewing throughout the day and may indicate potential desired product or service for the user. The preference profile may be stored locally or may be sent to the media content provider for remote storage. The product/service offering stream to the client terminal may be filtered or adjusted to suit user preference profile to meet social functionality preferences.

In some embodiments, a media stream may be accessed directly by a media renderer, for example, via the second input port 6220B. It will be appreciated that where the client terminal is connected to the media renderer 6200 via the first port 6220A, it will not have control over content accessed via the second input port 6220B.

By way of illustration only, control signals may use the Consumer Electronics Control (CEC) feature available, for example, with HDMI connections or the like. The CEC feature may provide a controller 6128 to command and control the media renderer 6200 by sending control signals via the client terminal 6120. For example, CEC Routing Control allows a user to control the switching of signal sources between input channels.

Where required, the controller 6128 may be operable to send control signals switching the input channel of the media renderer 6200 to the first input port 6220A as required. Accordingly, a personalized advert stream may be sent from the client terminal 6120 to the media renderer 6200 via the first input port 6220A for the duration of the advertising break in the media content stream. Optionally the media management system 6100 may be further operable to switch access back to the second port 6220B at the end of the advertising break; alternatively, the media content stream may be provided to the media renderer 6200 via the client terminal 6120.

Figure 6B:
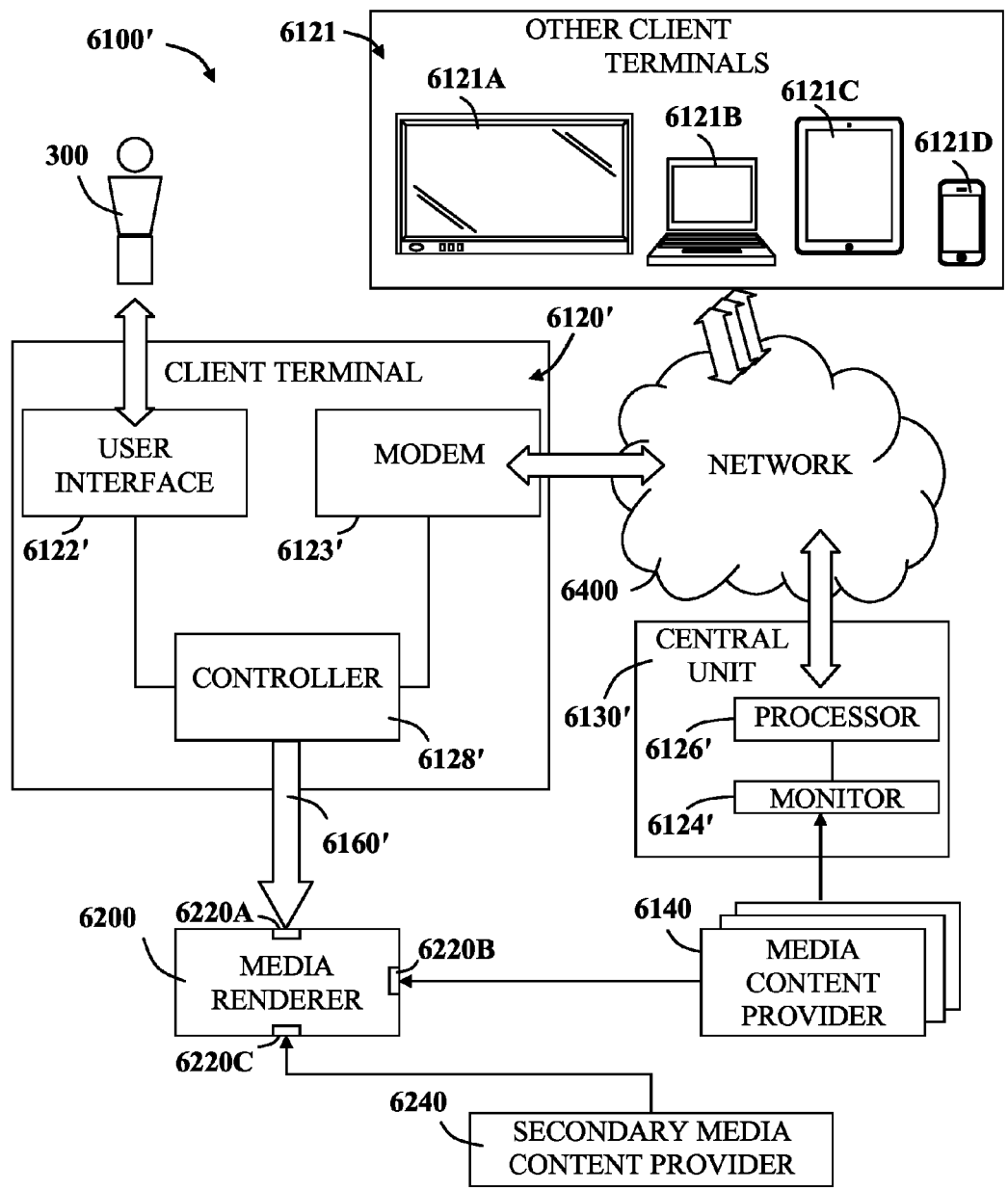
FIG. 6B is a block diagram representing another possible configuration for a distributed network-based system for content based management of a media renderer with central processing of home media viewing.

Referring now to FIG. 6B, showing another possible block diagram configuration for network-based distributed media management system 6100' that is network-based and distributed, for content based control of a media renderer 6200 with added functionality of social spaces applications, centrally processed and managed. The network-based distributed media management system 6100' includes a client terminal 6120' and a central unit 6130' in communication with a network 6400, such as the World Wide Web, or a local area network or other such networked computing system.

The central unit 6130' may provide specific functionality of group recording processing of the network-based distributed media management system 6100' to be performed remotely and communicated to the client terminal 6120' via a modem 6123' providing a connection to the network 6400. For example, the central unit 6130' may be operable to receive media content data from a media-monitor 6124', and to record a user preference profile related to media content accessed. The central unit 6130' may further have a processor 6126' receiving information, such as the current user preferences profile (with targeting characteristics) created locally on the client terminal 6120' or TV associated events from the client terminal 6120' to process and update user preference profile (with targeting characteristics) on the central unit 6130', controlling social application related content sent to this client terminal.

It is noted that for network-based architecture as indicated in FIG. 6B, some of the analytics may be performed on the controller of the terminal client. This may, for example, establish and maintain a local user preference profile. Alternatively or additionally, the media management system 6100' may send data pertaining to a viewer's watching behavior to the central unit and a user preference profile may be generated and maintained remotely.

It is further noted that a number of different client terminals 6121 may access a common central unit 130' possibly via a network 6400 such as the internet or the like. Accordingly, a social set of users using a variety of client terminals such as televisions 6121A, computers 6121B, tablets 6121C, telephones 6121D or the like, may be connected via the common central unit 6130' as described herein.

Although the different media management system architectures are described hereinbefore are for illustrative purposes, those skilled in the art will appreciate that other technologies may be used to implement the method of controlling content based phone call filtering.

For illustrative purposes only and better explain possible applications of the disclosure the following examples are presented. It is noted that the selection of applications is not to be considered exhaustive and that other applications may occur to those skilled in the art.

Figure 7:
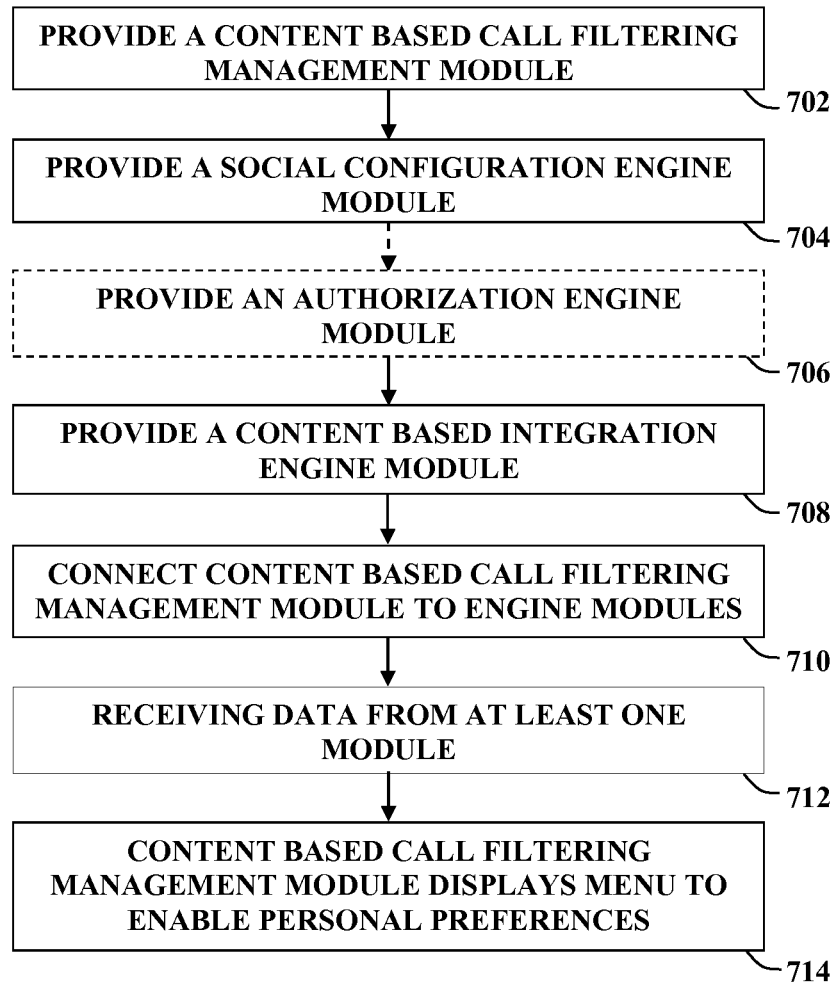
FIG. 7 is a flowchart representing possible software modules to support the disclosure of content based phone call filtering functionality.

Referring to the flowchart of FIG. 7, a method is disclosed for managing content based call filtering configuration of a social engine media platform incorporated into an STB or another communicating device, interacting with the incorporated phone application. The method includes the steps: providing a content based call filtering management module 702; providing a social configuration module 704; optionally, providing an authorization module 706; providing a content based integration module 708; connecting the content based call filtering management module to the other modules including the social configuration module, the authorization module and the integration module 710; receiving data from at least one of the other modules, typically via the management of content based call filtering module 712; and the content based call filtering management module presenting an output menu to a user to enable creating and managing content based call filtering functionality 714.

Figure 8:
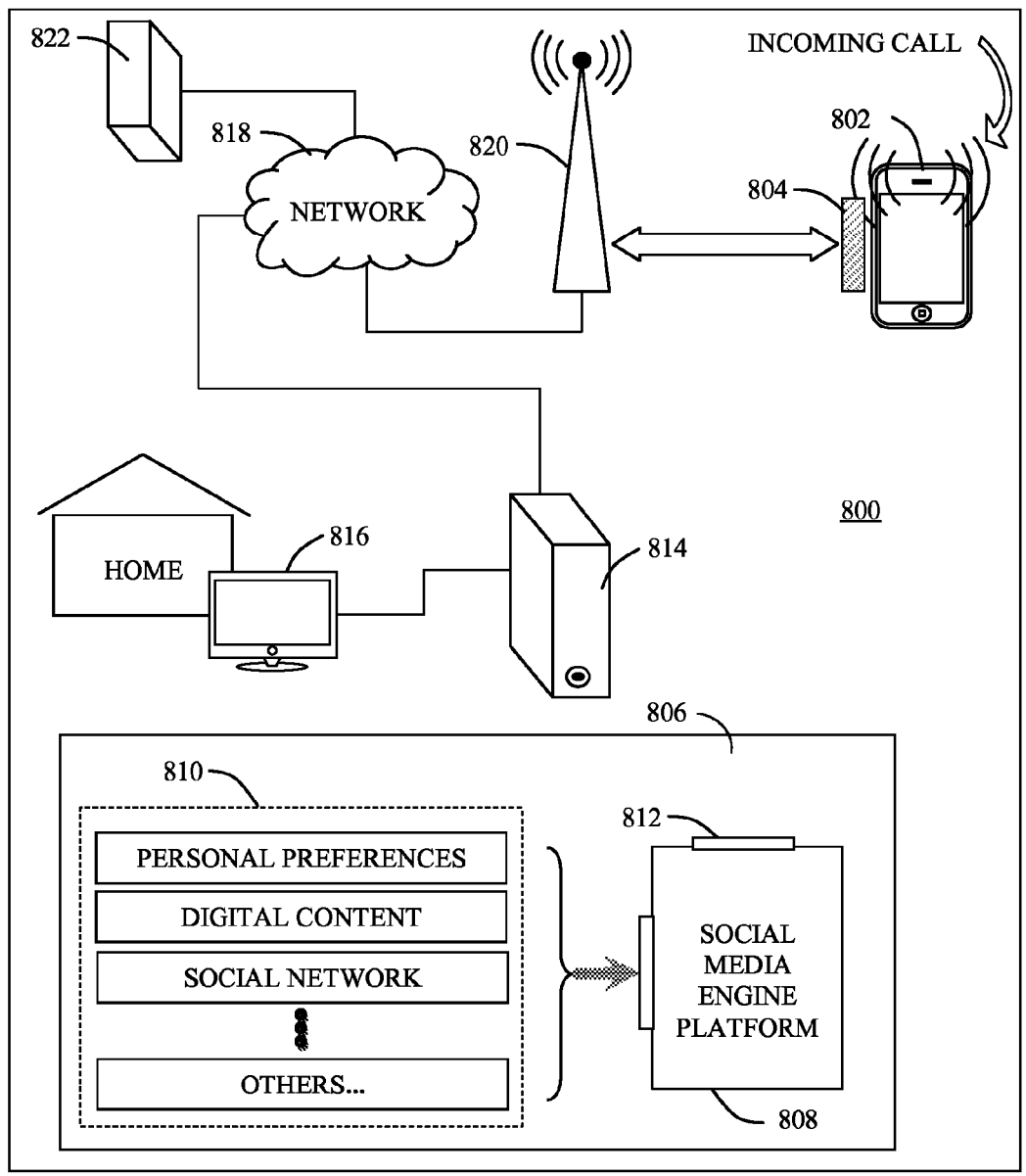
FIG. 8 is a schematic representation of the systems' components providing possible interactions to support the content based filtering of phone incoming calls.

Referring now to FIG. 8, a possible schematic representation is presented of a content based call filtering configuration system 800. The schematic representation includes a telephone handset 802 for receiving an incoming call validated by the phone application 804 incorporated into the telephone handset, communicating with application 806 incorporated into a set-top box (STB) 814. The STB incorporated application may include a social media platform 808, an input component 810 that may use categories based on receiving personal user preferences profile, media digital content, social spaces network input and additional data parameters. The social media platform may interact with the STB through the interface 812 and perform analysis to specifying the dynamic white list of allowed contacts', according to hereinabove values and categories.

The application 806, by way of example, may be include a comparator function receiving at least two parametric structures, possibly operable to return a Boolean operator indicating whether the parametric structures are identical or whether an index of similarity exceeds a threshold level. For illustrative purposes, a comparator function may take the form of:

$$F(\text{caller ID, Pr, Ip}) \rightarrow 1 \text{ or } 0$$

where contact ID is a contact identification value such as contact name, contact ID, contact tagged information and the like. Pr is a parametric structure in a matrix form, representing the preference profile of a recipient and Ip is another parametric structure in a matrix form, representing input profile of a contact. The parametric structures may contain a set of numbers representing internal values related to personal preferences, social network input and the like, such that:

$$Pr = \begin{pmatrix} Ar \\ Br \\ Cr \\ Dr \end{pmatrix} \quad Ip = \begin{pmatrix} Ai \\ Bi \\ Ci \\ Di \end{pmatrix}$$

where Ar and Ai may reflect a value indicating general personal preferences, Br and Bi may reflect social space indicator, Cr and Ci may reflect specific content indicator and the like.

The output of this function may be a Boolean parameter, where '1' may indicate a positive comparison (say above a preconfigured level) and '0' may indicate a false comparison.

The set-top-box 814 may be connected to the television 816 and to a computer network 818 such as the World Wide Web or internet, optionally via communication cables. It is particularly noted that the stationary nature of large televisions allows them to be readily connected to fast communication lines such as cables, optical fibers or the like.

The telephone handset 802 may be connected to a cellular network 820 wirelessly and thereby may receive incoming calls and communicate directly with the STB application for the dynamic white list updates. Optionally, a server 822 connected to the computer network 818 may be used to control the communication and to synchronize with the updated state of the dynamic white list.

Additionally, timing of updating the dynamic white list may occur at a pre-set time interval, configurable by the user and may also be triggered on specific events, such as new inputs from social spaces, changes to user preference profile, switching channel and program or switching to similar media such as gaming and the like.

Figure 9A:
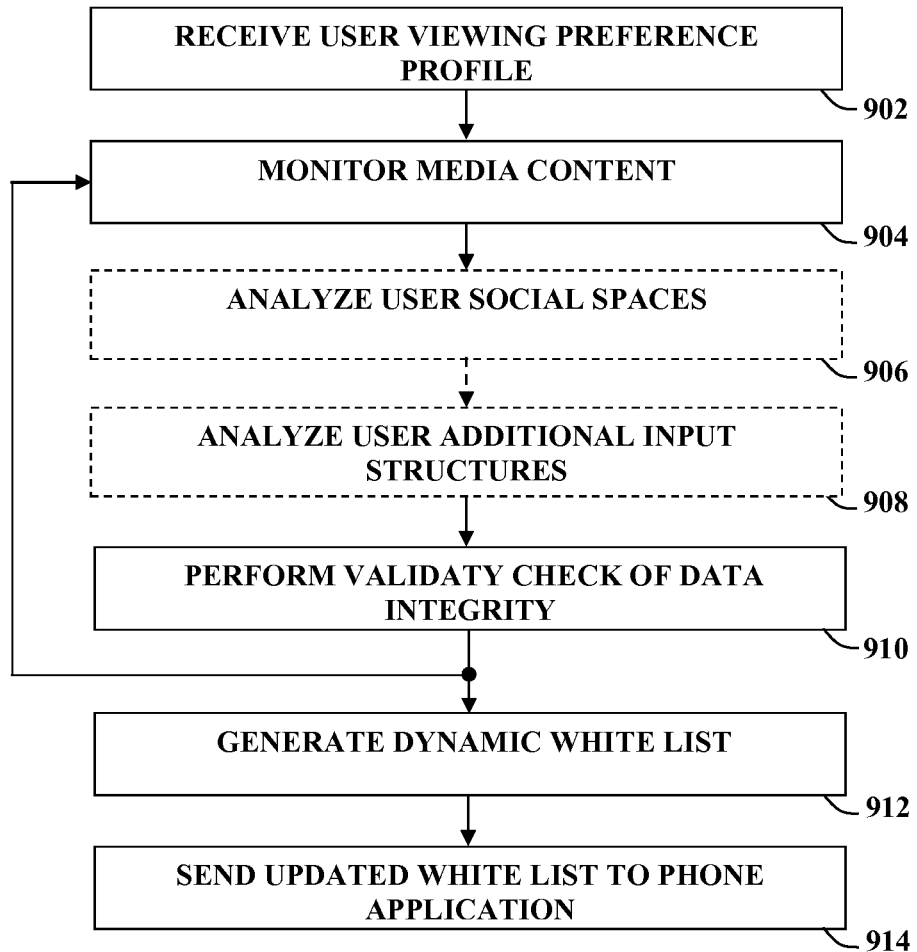
FIG. 9A is a flowchart representing selected actions of a method for software automatic update of a dynamic whitelist.

Referring now to the flowchart of FIG. 9A, various selected actions, are illustrated of a possible method for generating a dynamic white list. The dynamic white list, referred to herein, may be dependent upon several input data structures, where each data structure represents a category needed for determining the white list entries. These categories may include personal viewing preferences of a user, digital content viewed, social definitions coming from social spaces members and any additional data structure, if required.

The disclosure may provide a method for assigning dynamic entries to a white list of at least one contact comprising various steps. For example, a user viewing preferences profile may be received (902). The television digital or other media content may be continually monitored, perhaps to identify relevancy of current digital content consumed to a viewer's contacts, and occurrence of events such as switching to another channel, another program or switching to similar media such as gaming and the like (904). Such occurrences may initiate or precipitate corresponding adjustments to dynamic white list values. Optionally, users' social spaces may be analyzed to consider inputs and changes possibly relevant to updating the dynamic white list entries (906).

Optionally, an input data structure may be received including additional data for further analysis (908).

Optionally, a data validity check may be performed to verify data integrity before generation of the updated dynamic white list. If validation check fails, the system may try to assign automatic corrections or issue an error message (910).

Steps (904) through (910) may be triggered to occur by some specific event. Additionally, or alternatively the steps may occur repetitively at a pre-set time interval, which may be pre-defined or configured by the user.

Accordingly, the white list may be generated based on current digital media content, changes occurring in users' social spaces or any additional data structure defining further possible categories (912).

Optionally, an appropriate message may be sent to the client terminal to indicate a data validity error (914).

Optionally, the views and information of the data structure categories may be sent the client terminal for display (916).

Figure 9B:
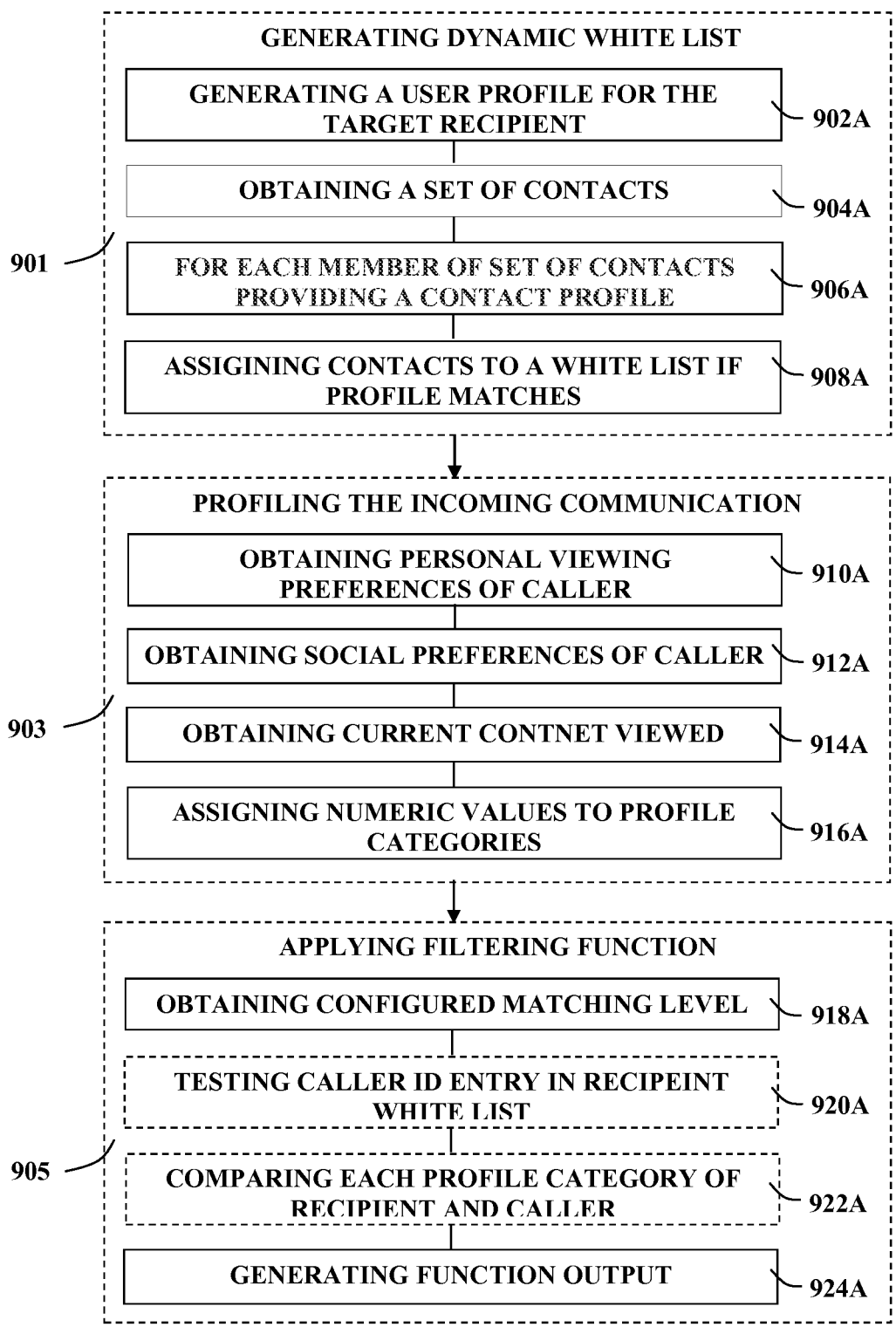
FIG. 9B is a flowchart representing selected actions of a method for software phone call filtering using functional comparisons.

Referring now to the flowchart of FIG. 9B, various selected actions, are illustrated of a possible method for software content based phone calls filtering using functional comparisons. The method includes the steps: generating a dynamic whitelist (901); profiling the incoming communication (903); and applying a filtering function (905).

The step of generating a dynamic whitelist (901) may optionally include the sub steps: generating a user profile for the target recipient (902A); obtaining a set of contacts (904A) where for each member of the set of contacts a contact profile is obtained (906A); and assigning the contact information to the recipient whitelist if matching is achieved (908A), where contact information may use contact name, contact ID, contact tagged information or the like.

Alternatively or additionally, the whitelist may include category identification information or parametric identification values, possibly in a matrix form where each category may define a numeric level identification value.

The step of profiling the incoming communication (903) may further include the sub steps: obtaining personal viewing preference profile of a contact (910A); obtaining social preferences of a contact (912A); obtaining the current media content viewed (914A); and assigning numeric values to profile categories (916A), possibly in a matrix form, with a distinguished value for each configurable category.

The step of applying a filtering function (905) may further include the sub steps: obtaining a configured matching level (918A), applying a default level if not accessible; Optionally, testing contact identity entry in recipient whitelist (920A); or optionally, comparing each profile category value of contact input structure and recipient profile structure (922A); and generating a Boolean parameter of success or fail (0 or 1), accordingly (924A);

It is noted that the function may take the form of: F (caller ID, Pr, Ip)→1 or 0 where contact ID identifies the contact as specified hereinabove, Pr is possibly a matrix representation of recipients profile category values and Ip is possibly a matrix representation of contact's profile category input, such as:

$$Pr = \begin{pmatrix} Ar \\ Br \\ Cr \\ Dr \end{pmatrix} \quad Ip = \begin{pmatrix} Ai \\ Bi \\ Ci \\ Di \end{pmatrix}$$

where Ar and Ai may reflect a number indicating general personal preferences, Br and Bi may reflect social space indicator, Cr and Ci may reflect specific content indicator and the like.

The output of this function may be a Boolean parameter, where '1' may indicate a positive comparison (to a preconfigured level) and '0' may indicate a false comparison.

Figure 10:
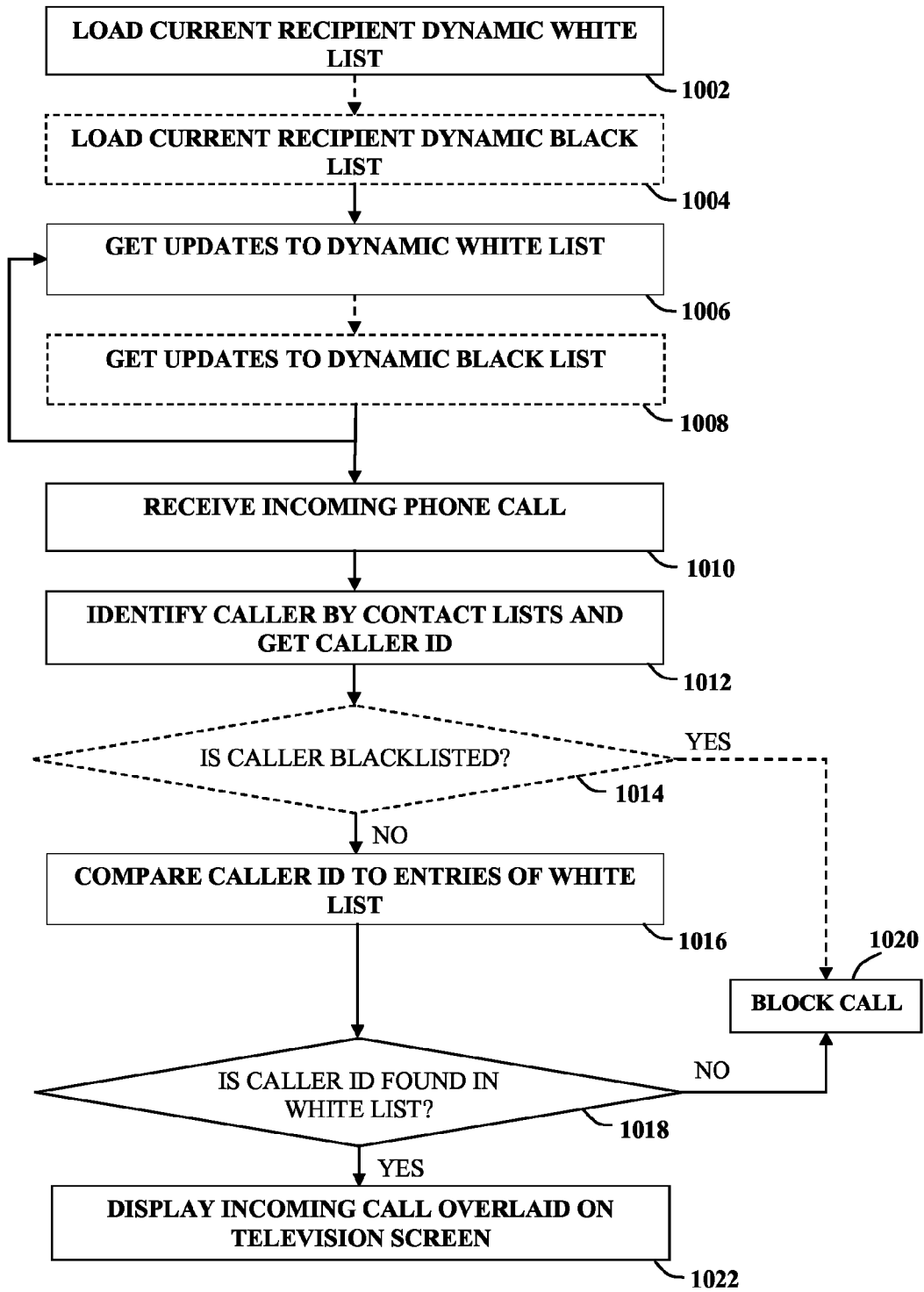
FIG. 10 is a flowchart representing selected actions of a method for software phone call filtering using specific contact identification comparisons.

Referring now to the flowchart of FIG. 10, various selected actions, are illustrated of a possible method for software phone call filtering using specific contact identification comparisons. The method assumes pre-configured whitelist with an optional blacklist to search for an entry of current contact, possibly identified by contact name, contact ID, and contact tagged information or the like.

According to the method, current dynamic white list is received through the telephoned handset application (1002).

Optionally, the current dynamic black list is received through the telephoned handset application (1004).

Updates to the dynamic white list may be received (1006), and optionally, updates to the dynamic black list may be received (1008), may be triggered specifically or occur repetitively at a pre-set time interval. This time interval may be pre-defined or configured by the user.

Accordingly, an incoming phone call is received (1010), the contact is identified to fetch his/her contact ID (1012).

It is noted that the caller ID may refer to identification of the contact by a contact ID, a contact name, a contact telephone number, a contact tagged identification and the like.

Optionally, the contact is tested to be black listed (1014). If contact is black listed or unknown, call is blocked (1020), holding until the next incoming call is received. Contact ID is now compared to the dynamic white list entries (1016). If contact ID found in white list (1018), the call goes through and the contact ID may be indicated and overlaid on the television screen (1022). If called ID not found, call is blocked (1020), holding until the next incoming call is received.

Optionally, the views and information of the data structure categories may be sent the client terminal for display.

The methods and systems described herein may be deployed in part or in whole through a machine or device that executes computer software, program codes, and/or instructions on a processor. The processor may be part of a server, client, network infrastructure, mobile computing platform, stationary computing platform, or other computing platform. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and systems described herein may be deployed in part or in whole through a machine that executes computer software on a server, client, firewall, gateway, hub, router, or other such computer and/or networking hardware.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The scope of the disclosed is may be defined by the appended claims and includes both combinations and sub combinations of the various features described hereinabove as well as variations and modifications thereof, which would occur to persons skilled in the art upon reading the foregoing description.

Technical and scientific terms used herein should have the same meaning as commonly understood by one of ordinary skill in the art to which the disclosure pertains. Nevertheless, it is expected that during the life of a patent maturing from this application many relevant systems and methods will be developed.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A communication filtering system for blocking disturbing incoming calls before they reach a target recipient thereby providing an uninterrupted experience of consuming media content, said system comprising:
    a first module, to monitor said media content being consumed by the target recipient; and
    a second module, to manage filtering of incoming communications before they reach said target recipient by selectively allowing incoming calls to reach the target recipient according to said media content being monitored; wherein the filtering comprises profiling said incoming calls and said profiling is based on a group consisting of all of the followings:
        (i) a contact identification input wherein said contact identification input is selected from a group consisting of all of a contact name, a contact ID, a contact phone area, and contact tagged information,
        (ii) a contact preference input wherein said contact preference input reflects a viewing preference of a contact, and
        (iii) a social network input wherein said social network input reflects collaborating information of social spaces.

2. The communication filtering system according to claim 1, further comprising a social configuration module configured to manage one or more social entities.

3. The communication filtering system according to claim 2, wherein said social entities are selected from a group consisting of social groups, social sets, and social group members.

4. The communication filtering system according to claim 2, further configured to manage assignment of permissions to said social entities.

5. The communication filtering system according to claim 1, wherein the filtering comprises generation of one or both of a dynamic whitelist and a dynamic blacklist.

6. The communication filtering system according to claim 1, wherein said filtering comprises comparing at least one allowable profiling structure with at least one contact input reference.

7. The communication filtering system according to claim 1, further comprising a media monitor configured to receive said media content.

8. The communication filtering system according to claim 1, wherein said second module is further configured to control presentation of media by a media renderer based on the filtering.

9. The communication filtering system according to claim 1, wherein said second module is configured to connect to a telephony system to display information related to said incoming calls.

10. The communication filtering system according to claim 1, wherein said second module is configured to send a control signal to a media renderer using a Consumer Electronics Control feature.

\* \* \* \* \*